(12) United States Patent
Susca et al.

(10) Patent No.: US 11,680,549 B2
(45) Date of Patent: Jun. 20, 2023

(54) FLUID INJECTION SYSTEMS FOR FLUID LINE PURGING

(71) Applicant: Hamilton Sundstrand Corporation, Charlotte, NC (US)

(72) Inventors: Ryan Susca, Windsor, CT (US); Steve Doerner, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 672 days.

(21) Appl. No.: 16/593,324

(22) Filed: Oct. 4, 2019

(65) Prior Publication Data

US 2021/0102515 A1 Apr. 8, 2021

(51) Int. Cl.
*F02M 25/08* (2006.01)
*F02M 59/46* (2006.01)
(Continued)

(52) U.S. Cl.
CPC ............ *F02M 59/462* (2013.01); *F02C 7/22* (2013.01); *F02C 7/232* (2013.01); *F02C 7/30* (2013.01);
(Continued)

(58) Field of Classification Search
CPC .... F02M 59/462; F02M 59/00; F02M 59/464; F02C 7/22; F02C 7/232; F02C 7/30; F23K 5/18; Y10T 137/4259
(Continued)

(56) References Cited

U.S. PATENT DOCUMENTS 5,095,694 A * 3/1992 Shekleton ............... F02C 7/232
60/741
5,243,816 A * 9/1993 Huddas .................... F02B 77/04
60/734
(Continued)

FOREIGN PATENT DOCUMENTS

EP 2065643 A2 6/2009

OTHER PUBLICATIONS

Extended European Search Report dated Jul. 17, 2020, issued during the prosecution of European Patent Application No. EP 19216103.2.
(Continued)

*Primary Examiner* — Logan M Kraft
*Assistant Examiner* — John D Bailey
(74) *Attorney, Agent, or Firm* — Locke Lord LLP; Daniel J. Fiorello; Gabrielle L. Gelozin (57) ABSTRACT

A fluid injection system can include a main flow line, a primary flow line connected to the main flow line, a primary flow valve disposed on the primary flow line and configured to selectively allow injectant flow to the primary flow line, a secondary flow line connected to the main flow line, and a secondary flow valve disposed on the secondary flow line and configured to selectively allow injectant flow to the secondary flow line. The system can include a primary purge branch in fluid communication with the primary flow line and connected to a purge gas line, a primary purge valve disposed in the primary purge branch between the primary flow line and the purge gas line, a secondary purge branch in fluid communication with the secondary flow line, and a secondary purge valve disposed between the purge gas line and both of the primary purge branch and the secondary purge branch.

10 Claims, 3 Drawing Sheets

(51) Int. Cl.
  *F02C 7/232* (2006.01)
  *F02C 7/22* (2006.01)
  *F02C 7/30* (2006.01)
  *F23K 5/18* (2006.01)
  *F02M 59/00* (2006.01)

(52) U.S. Cl.
  CPC .............. *F23K 5/18* (2013.01); *F02M 59/00* (2013.01); *F02M 59/464* (2013.01); *Y10T 137/4259* (2015.04)

(58) Field of Classification Search
  USPC .......................................................... 60/740
  See application file for complete search history.

(56) References Cited

U.S. PATENT DOCUMENTS

| | | | | |
|---|---|---|---|---|
| 6,438,963 | B1* | 8/2002 | Traver | F23K 5/147 60/39.463 |
| 6,892,544 | B2* | 5/2005 | Futa, Jr. | F02C 7/228 60/776 |
| 8,104,258 | B1* | 1/2012 | Jansen | F23K 5/18 60/734 |
| 8,573,245 | B1* | 11/2013 | Jansen | F02C 7/232 137/240 |
| 9,103,284 | B2* | 8/2015 | Erickson | F02C 9/34 |
| 10,012,387 | B2* | 7/2018 | Patel | F23R 3/28 |
| 2003/0172641 | A1* | 9/2003 | Dixon | F02C 7/228 60/734 |
| 2003/0200754 | A1* | 10/2003 | Futa, Jr. | F02C 7/232 60/734 |
| 2005/0011197 | A1* | 1/2005 | Tuttle | F02C 7/22 60/773 |
| 2008/0034733 | A1* | 2/2008 | Miller | F01N 3/32 60/297 |
| 2009/0139241 | A1* | 6/2009 | Hirata | F23N 1/002 60/39.821 |
| 2012/0006433 | A1* | 1/2012 | Morgan | H03H 11/18 137/597 |
| 2012/0260663 | A1* | 10/2012 | Pidcock | F02C 7/222 60/740 |
| 2012/0291448 | A1* | 11/2012 | Slobodyanskiy | F23R 3/343 60/776 |
| 2015/0361884 | A1* | 12/2015 | Kramer | F02C 6/16 60/741 |
| 2015/0377059 | A1* | 12/2015 | Debbouz | F01D 17/08 60/776 |
| 2017/0234229 | A1* | 8/2017 | Ribarov | F02C 7/232 60/39.094 |
| 2019/0249604 | A1* | 8/2019 | Duchaine | F02C 7/232 |
| 2020/0362760 | A1* | 11/2020 | Morenko | F02C 7/232 |
| 2020/0362761 | A1* | 11/2020 | Shenouda | F02C 7/228 |
| 2020/0362763 | A1* | 11/2020 | Jarvo | F02C 7/222 |
| 2020/0362764 | A1* | 11/2020 | Saintignan | F02C 6/00 |

OTHER PUBLICATIONS

European Communication Pursuant to Art. 94(3) EPC, dated Sep. 6, 2022, issued during the prosecution of European Patent Application No. EP19216103.2, 6 pages.

* cited by examiner

FLUID INJECTION SYSTEMS FOR FLUID LINE PURGING

FIELD

This disclosure relates to fluid injection systems, e.g., to injection systems for turbomachines.

BACKGROUND

The extreme operating environments (temperature and pressure) that aircraft injection systems are subjected to tend to cause nozzle build-up and clogging, especially in systems that do not have a continuous duty cycle. In order to reduce nozzle build-up, it is advantageous to evacuate the flow lines when the system is not in use. There are two main methods, the first being use of the injectant fluid pumping system to suction the fluid out of the flow lines with an ejection system. Here, the injectors are closed off and the ejection system will evacuate the flow lines system. Unfortunately, the injection nozzles must close somewhere internally and the wetted volume between the closure point and the injection point cannot be evacuated. This remaining fluid will eventually work its way out of the nozzle either due to suction from the air stream or vaporization, but those repeated short exposures can cause nozzle build-up.

The second method is to use an external source to purge the lines, such as using compressed air to purge the lines from the metering point all the way to the injection point, pushing all the remaining fluid into the air stream. An issue with this purge system is that a method is needed to seal the injection system upstream of the metering point from the compressed air to prevent air entering the upstream system. This becomes further complicated when multi-stage injection (in this case, a system with multiple injection ports) is required and stages are activated and purged individually. This requires many components to ensure proper separation of the compressed air and injectant fluid during injection and purging.

Such conventional methods and systems have generally been considered satisfactory for their intended purpose. However, there is still a need in the art for improved fluid injection systems. The present disclosure provides a solution for this need.

SUMMARY

A fluid injection system can include a main flow line configured to pass injectant flow therethrough, a primary flow line connected to the main flow line and configured to provide a primary portion of the injectant flow from the main flow line to a primary injector, and a primary flow valve disposed on the primary flow line and configured to selectively allow injectant flow to the primary flow line from the main flow line in an open primary flow valve state, and to prevent injectant flow to the primary flow line from the main flow line in a closed primary flow valve state. The system can include a secondary flow line connected to the main flow line and configured to provide a secondary portion of the injectant flow from the main flow line to a secondary injector, and a secondary flow valve disposed on the secondary flow line and configured to selectively allow injectant flow to the secondary flow line from the main flow line in an open secondary flow valve state, and to prevent injectant flow to the secondary flow line from the main flow line in a closed secondary flow valve state.

The system can include a primary purge branch in fluid communication with the primary flow line and connected to a purge gas line to receive a purge gas flow from the purge gas line. The system can include a primary purge valve disposed in the primary purge branch between the primary flow line and the purge gas line, the primary purge valve configured to prevent the purge gas flow in a closed primary purge valve state, and to allow purge gas flow in an open primary purge valve state to purge the primary flow line.

The system can include a secondary purge branch in fluid communication with the secondary flow line and connected to a purge gas line to receive a purge gas flow from the purge gas line. The system can include a secondary purge valve disposed between the purge gas line and both of the primary purge branch and the secondary purge branch, the secondary purge valve configured to selectively prevent purge gas flow to the primary purge gas valve and the secondary purge branch from the purge gas line in a closed secondary purge valve state, and to allow purge gas flow to each of the primary purge gas valve and the secondary purge branch from the purge gas line in an open secondary purge valve state.

The first purge branch and the second purge branch can be in fluid communication such that the primary purge valve is between the primary flow line and the secondary flow line. In certain embodiments, the primary purge valve can be a check valve such that the primary purge valve transitions from the closed primary purge valve state to the open primary purge valve state when pressure in the primary flow line is exceeded by pressure in the secondary flow line and/or purge gas line.

In certain embodiments, the primary flow valve, the secondary flow valve, and the secondary purge valve can be solenoid valves. For example, the primary flow valve, the secondary flow valve, and the secondary purge valve can include a biased de-energized state and an energized state. Any other suitable controllable valve type is contemplated herein.

In certain embodiments, the secondary flow valve and the secondary purge valve can be configured to have opposite states such that when one is open, the other is closed. The open secondary flow valve state can be the energized state of the secondary flow valve. The closed secondary purge valve state can be an energized state of the secondary purge valve. The closed secondary flow valve state can be the biased de-energized state of the secondary flow valve, and the open secondary purge valve state can be the biased de-energized state of the secondary purge valve. Any other suitable arrangement is contemplated herein.

The system can include a controller configured to control each of the primary flow valve, the secondary flow valve, and the secondary purge valve. The controller can be configured to execute a purge sequence from an operational state where injectant flow is flowing through both the primary and secondary flow lines. The purge sequence can include closing the secondary flow valve to shut off injectant flow to the secondary flow line from the main line. The purge sequence can include opening the secondary purge valve after or during closing the secondary flow valve to cause purge gas flow to purge the secondary flow line.

The purge sequence can further include allowing injectant flow in the primary flow line to reduce in pressure to below the purge gas pressure to cause the primary purge valve to open to cause purge gas flow to purge the primary flow line, and closing the primary flow valve after purging of the primary flow line. The purge sequence can further include briefly opening the secondary flow valve after closing the primary flow valve to cause any remainder fluid in the secondary flow line to be purged into the main flow line, then closing the secondary flow valve.

In accordance with at least one aspect of this disclosure, a fuel system can include a fluid injection system, e.g., as disclosed above. The fluid injection system can have a plurality of controllable valves and a passive valve arranged to cause selective and/or sequential purging of a secondary flow line and a primary flow line. The plurality of controllable valves can include three controllable valves, and the three controllable valves and the passive valve can be the only valves in the fluid injection system, for example. The three controllable valves can be solenoid valves, for example, e.g., as described above. The passive valve can be a check valve, for example. Any other suitable valve types are contemplated herein.

In accordance with at least one aspect of this disclosure, a method can include operating one or more controllable valves to purge a secondary flow line of a fluid injection system with a purge gas flow, and causing a passive valve to open using a purge gas pressure to cause purging of a primary flow line of the fluid injection system after purging the secondary flow line. Operating one or more controllable valve can include closing a secondary flow valve to shut off injectant flow to the secondary flow line from a main line, and opening a secondary purge valve after or during closing the secondary flow valve to cause purge gas flow to purge the secondary flow line. Causing the passive valve to open can include allowing injectant flow in the primary flow line to reduce in pressure to below the purge gas pressure to cause the passive valve to open to cause purge gas flow to purge the primary flow line.

The method can further include closing a primary flow valve after purging of the primary flow line. The method can further comprise briefly opening the secondary flow valve after closing the primary flow valve to cause any remainder fluid in the secondary flow line to be purged into the main flow line, then closing the secondary flow valve.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
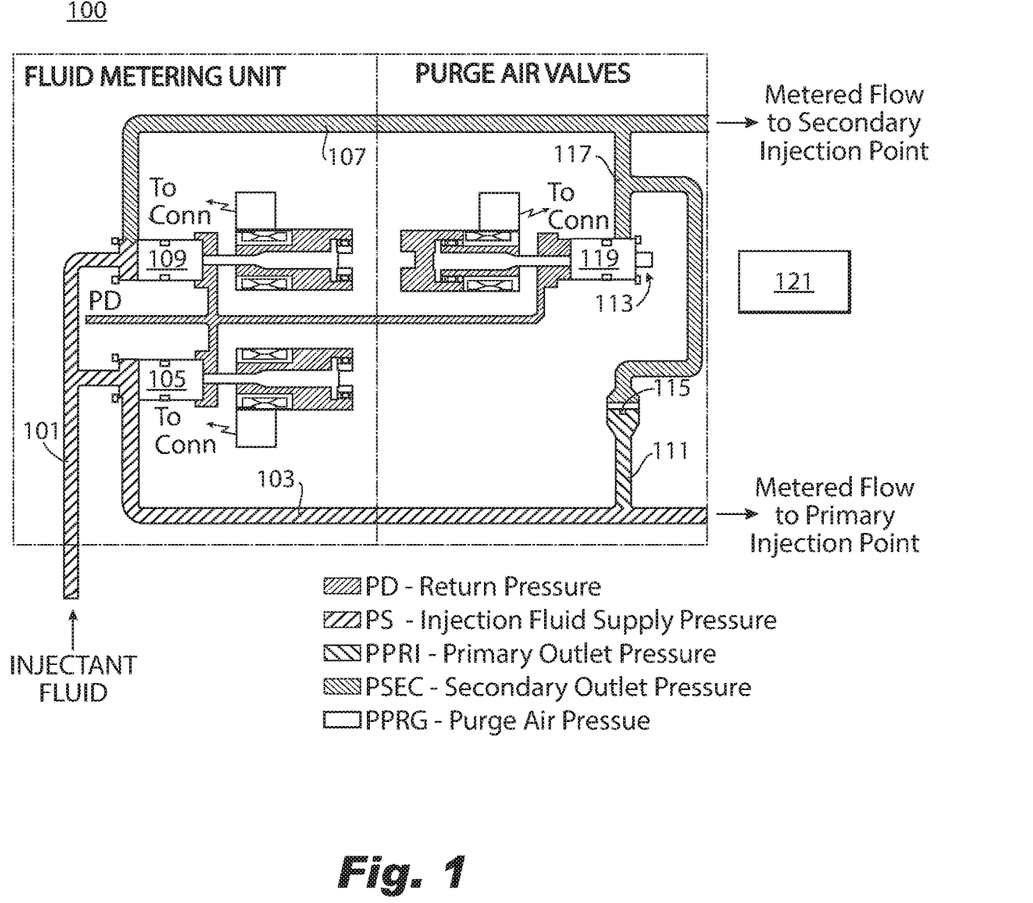
FIG. 1 is a schematic diagram showing an embodiment of a system in accordance with this disclosure, shown in an operational mode were injectant is flowing through both a primary flow line and a secondary flow line.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Figure 2:
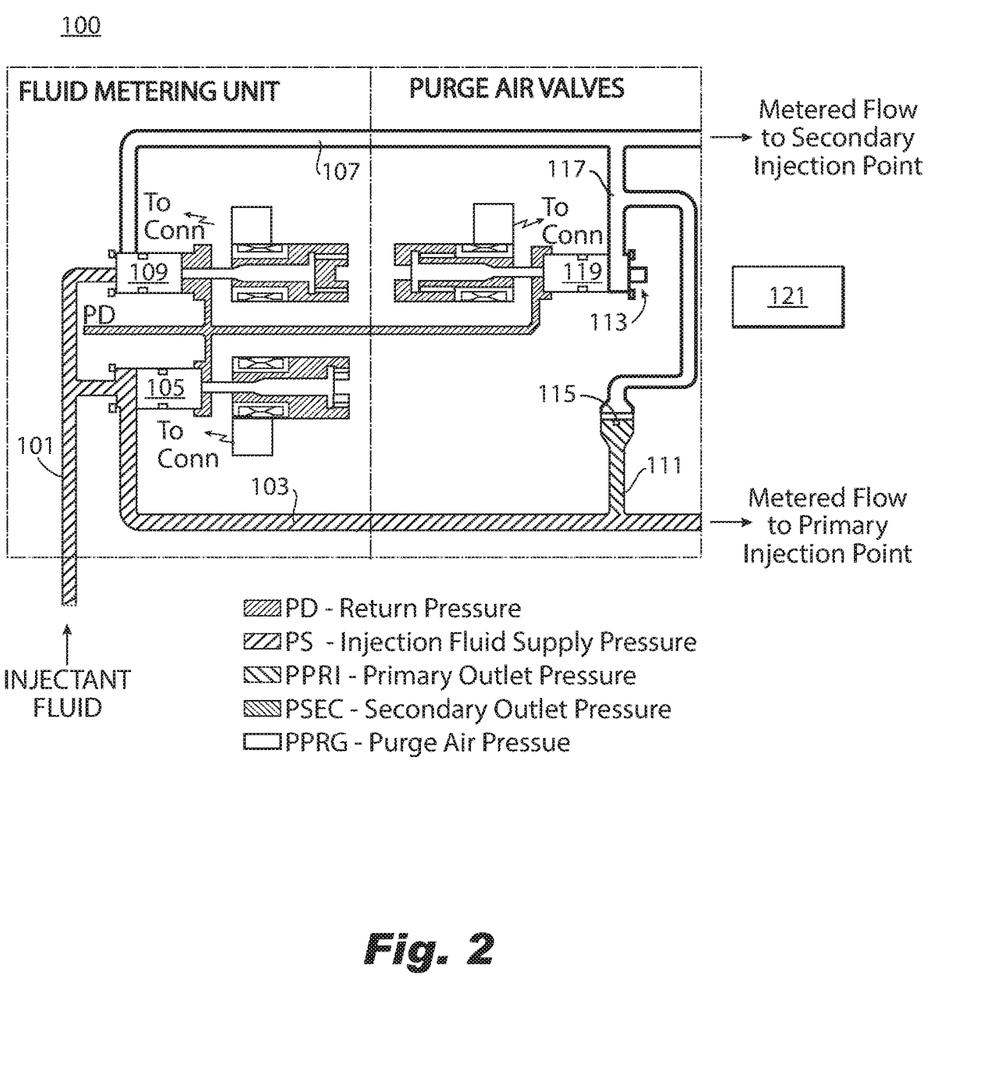
FIG. 2 is a schematic diagram of the embodiment of FIG. 1, shown in a secondary line purge mode where injectant is flowing through the a primary flow line and the secondary flow line has been purged.
Figure 3:
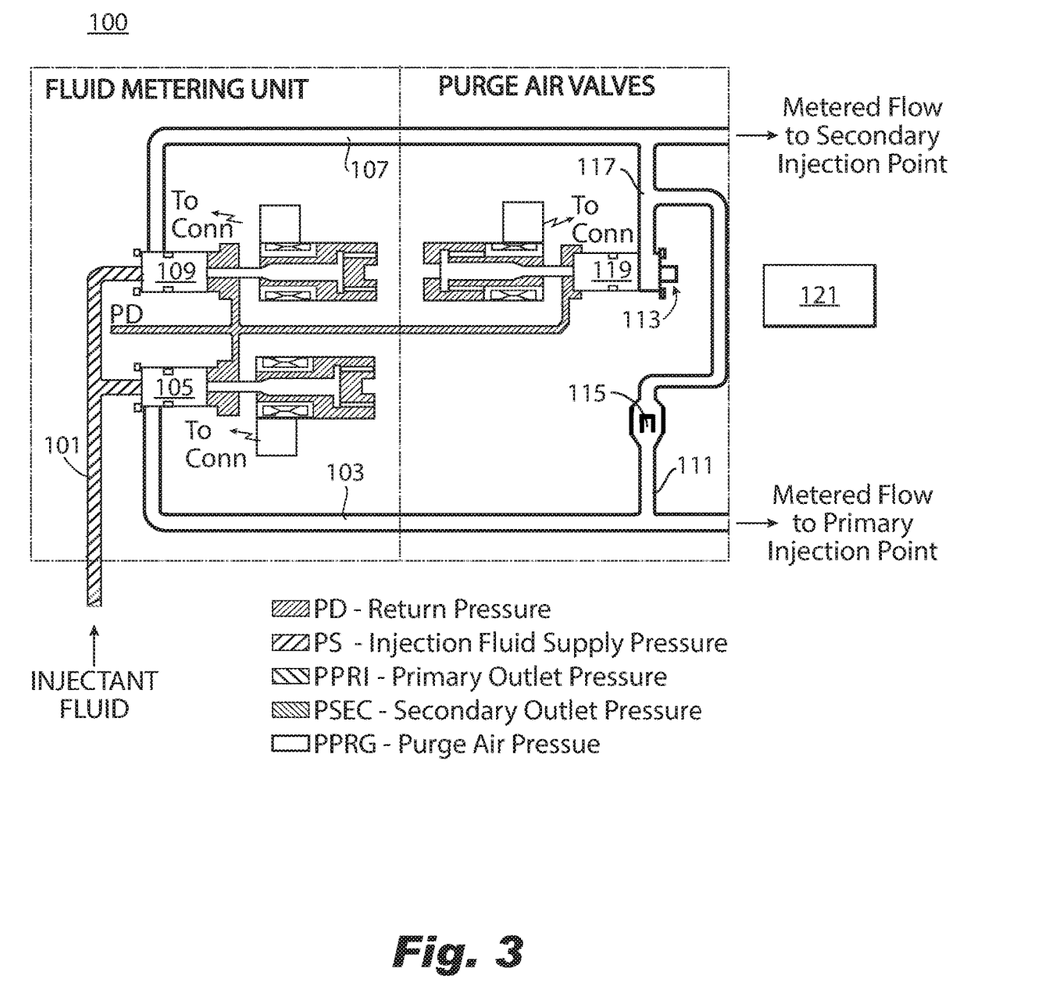
FIG. 3 is a schematic diagram of the embodiment of FIG. 1, shown in a complete purge mode where the primary flow line and the secondary flow line have been purged.

Referring to FIGS. 1-3, a fluid injection system 100 can include a main flow line 101 configured to pass injectant flow therethrough, and a primary flow line 103 connected to the main flow line 101 and configured to provide a primary portion of the injectant flow from the main flow line 101 to a primary injector (not shown). The system 100 can include a primary flow valve 105 disposed on the primary flow line 103 and configured to selectively allow injectant flow to the primary flow line 103 from the main flow line 101 in an open primary flow valve state (e.g., as shown in FIGS. 1 and 2), and to prevent injectant flow to the primary flow line 103 from the main flow line 101 in a closed primary flow valve state (e.g., as shown in FIG. 3).

The system 100 can include a secondary flow line 107 connected to the main flow line 101 and configured to provide a secondary portion of the injectant flow from the main flow line 101 to a secondary injector (not shown). The system 100 can include a secondary flow valve 109 disposed on the secondary flow line 107 and configured to selectively allow injectant flow to the secondary flow line 107 from the main flow line 101 in an open secondary flow valve state (e.g., as shown in FIG. 1), and to prevent injectant flow to the secondary flow line 107 from the main flow line 101 in a closed secondary flow valve state (e.g., as shown in FIGS. 2 and 3).

The system 100 can include a primary purge branch 111 in fluid communication with the primary flow line 103 and connected (e.g., directly or indirectly) to a purge gas line 113 to receive a purge gas flow from the purge gas line 113. The system 100 can include a primary purge valve 115 disposed in the primary purge branch 111 between the primary flow line 103 and the purge gas line 113. The primary purge valve 115 configured to prevent the purge gas flow in a closed primary purge valve state (e.g., as shown in FIGS. 1 and 2), and to allow purge gas flow in an open primary purge valve state (e.g., as shown in FIG. 3) to purge the primary flow line 103.

The system 100 can include a secondary purge branch 117 in fluid communication with the secondary flow line 107 and connected to a purge gas line 113 (e.g., directly or indirectly) to receive a purge gas flow from the purge gas line 113. The system 100 can include a secondary purge valve 119 disposed between the purge gas line 113 and both of the primary purge branch 111 and the secondary purge branch 117. The secondary purge valve 119 can be configured to selectively prevent purge gas flow to the primary purge gas valve 115 and the secondary purge branch 117 from the purge gas line 113 in a closed secondary purge valve state (e.g., as shown in FIG. 1), and to allow purge gas flow to each of the primary purge gas valve 115 and the secondary purge branch 117 from the purge gas line 113 in an open secondary purge valve state (e.g., as shown in FIGS. 2 and 3).

The purge gas line 113 can be connected to any suitable source. For example, the purge gas can be pressurized bleed air from a turbomachine compressor, and/or any other suitable air source.

In certain embodiments, the first purge branch 111 and the second purge branch 117 can be in fluid communication such that the primary purge valve 115 is between the primary flow line 103 and the secondary flow line 107, e.g., as shown. In certain embodiments, e.g., as shown, the primary purge valve 115 can be a check valve such that the primary purge valve 115 transitions from the closed primary purge valve state (e.g., as shown in FIGS. 1 and 2) to the open primary purge valve state (e.g., as shown in FIG. 3) when pressure in the primary flow line 103 is exceeded by pressure in the secondary flow line 107 and/or primary and/or secondary purge gas line 111, 117 (e.g., on the secondary flow line side of the primary purge valve 115).

In certain embodiments, the primary flow valve 105, the secondary flow valve 109, and the secondary purge valve 119 can be solenoid valves (e.g., as shown). For example, the primary flow valve 105, the secondary flow valve 109, and the secondary purge valve 119 can include a biased de-energized state (e.g., a null state such that when de-energized, the respective valve is biased to an open or closed position) and an energized state (e.g., an activated state such that the valve is pushed or pulled against the bias to an open or closed state). The solenoid valves can be operatively connected to and configured to be controlled by a controller 121. Any other suitable controllable valve type is contemplated herein for the primary flow valve 105, secondary flow valve 109, and/or the secondary purge valve 119 (e.g., a hydraulic valve).

In certain embodiments, the secondary flow valve 109 and the secondary purge valve 119 can be configured to have opposite states such that when one is open, the other is closed (e.g., as shown in FIGS. 1-3). The open secondary flow valve state (e.g., as shown in FIG. 1) can be the energized state of the secondary flow valve 109. The closed secondary purge valve state (e.g., as shown in FIG. 1) can be an energized state of the secondary purge valve 119. The closed secondary flow valve state (e.g., as shown in FIGS. 2 and 3) can be the biased de-energized state of the secondary flow valve 109, and the open secondary purge valve state (e.g., as shown in FIGS. 2 and 3) can be the biased de-energized state of the secondary purge valve 119. Any other suitable arrangement of states is contemplated herein. For example, it is contemplated that the energized/de-energized states of the valves 109, 119 can be the same.

The system 100 can include a controller 121 configured to control each of the primary flow valve 105, the secondary flow valve 109, and the secondary purge valve 119. The controller 121 can include any suitable hardware module(s) and/or software module(s) to configure to perform and suitable function, e.g., any sequence and/or method disclosed herein.

The controller 121 can be configured to execute a purge sequence from an operational state (e.g., as shown in FIG. 1) where injectant flow is flowing through both the primary and secondary flow lines 103, 107. The purge sequence can include closing the secondary flow valve 109 to shut off injectant flow to the secondary flow line 107 from the main line 101 (e.g., as shown in FIG. 2). The purge sequence can include opening the secondary purge valve 119 after or during closing the secondary flow valve 109 to cause purge gas flow to purge the secondary flow line 107 (e.g., as shown in FIG. 2).

Referring to FIG. 3, the purge sequence can then include allowing injectant flow in the primary flow line 103 to reduce in pressure to below the purge gas pressure to cause the primary purge valve 115 to open to cause purge gas flow to purge the primary flow line 103. For example, the controller 121 can begin to close the primary flow valve 105 which can cause the pressure in the primary flow line 103 to decay. As pressure decays, the primary purge valve 115 can be forced open as the purge gas pressure becomes greater than the pressure in the primary flow line 103.

The purge sequence can then include then closing the primary flow valve 105 after purging of the primary flow line 103, e.g., as shown in FIG. 3. In certain embodiments, the purge sequence can further include briefly opening the secondary flow valve 109 after closing the primary flow valve 105 to cause any remainder fluid in the secondary flow line 107 to be purged into the main flow line 101, then closing the secondary flow valve 109 again. It is contemplated that certain embodiments may be configured to allow an amount of purge gas flow to enter the main flow line 101 in order to fully purge the primary and/or secondary flow lines 103, 107. Any other suitable sequence(s) or portion(s) thereof are contemplated herein.

In accordance with at least one aspect of this disclosure, a fuel system can include a fluid injection system, e.g., system 100 as disclosed above. As disclosed above, in certain embodiments, the fluid injection system 100 can have a plurality of controllable valves and a passive valve arranged to cause selective and/or sequential purging of a secondary flow line 103 and a primary flow line 107. The plurality of controllable valves can include three controllable valves, e.g., valves 105, 109, and 119 as shown in FIGS. 1-3. The three controllable valves and the passive valve, e.g., valve 115, can be the only valves in the fluid injection system, for example. The three controllable valves can be solenoid valves, for example, e.g., as described above. The passive valve can be a check valve, for example. Any other suitable valve types are contemplated herein.

In accordance with at least one aspect of this disclosure, a method can include operating one or more controllable valves to purge a secondary flow line of a fluid injection system with a purge gas flow, and causing a passive valve to open using a purge gas pressure to cause purging of a primary flow line of the fluid injection system after purging the secondary flow line. Operating one or more controllable valve can include closing a secondary flow valve to shut off injectant flow to the secondary flow line from a main line, and opening a secondary purge valve after or during closing the secondary flow valve to cause purge gas flow to purge the secondary flow line. Causing the passive valve to open can include allowing injectant flow in the primary flow line to reduce in pressure to below the purge gas pressure to cause the passive valve to open to cause purge gas flow to purge the primary flow line.

The method can further include closing a primary flow valve after purging of the primary flow line. The method can further comprise briefly opening the secondary flow valve after closing the primary flow valve to cause any remainder fluid in the secondary flow line to be purged into the main flow line, then closing the secondary flow valve.

Embodiments allow the pressurized injectant fluid to enter the primary and secondary flow paths through the flow control solenoids. The controller can command the position of these solenoids, and, as the operating conditions no longer require secondary injection, the system can command the secondary flow solenoid closed and afterwards command the secondary purge solenoid open. Purge air can enter the secondary flow path to evacuate any remaining injectant fluid. Once the operating conditions no longer require primary injection, the primary flow solenoid can be commanded closed, and the fluid pressure decays in the primary flow path. Once the fluid pressure drops to a sufficient level for the purge air pressure to overpower the primary purge valve, the primary purge valve will then allow fluid to be evacuated with purge air. When conditions require primary injection again, the primary flow control solenoid can be commanded open and the rising fluid pressure will close the primary purge valve preventing purge air from entering the primary flow path. As secondary injection is required again the secondary purge solenoid can be closed and the secondary flow solenoid can be opened.

Embodiments allow system level split such that both sides do not have to be open to purge both lines. Embodiments can accomplish this with only four valves, e.g., three controllable valves and a single passive valve, for example. Certain embodiments include the benefit that solenoid flow valves can stay closed and build pressure in front of closed solenoids before allowing flow when starting up the system.

Certain embodiments allow a combination of three solenoids and one check valve to manage both injectant fluid and purge air flow. Two solenoids can be used to turn on/off fluid flow to the injection lines. One solenoid and one check valve can be used to turn on/off purge air flow to the injection lines. Purging of the secondary line can be user selectable and can be done at any time by closing the secondary flow valve and opening the secondary purge solenoid, for example. Purging of the primary line can be achieved based on system pressures, e.g., once the primary flow valve is moved toward a closed state and the pressure has dropped below purge air pressure, the primary purge valve (e.g., a check valve) will open, allowing purge air to flow down the primary flow line.

Embodiments can eliminate the need for a primary purge solenoid which reduces control system complexity (e.g., control laws, Built-In Test, and improved reliability). Trading a solenoid for a passive valve also can reduce recurring costs. Embodiments can reduce the build-up and/or clogging of fluid lines and nozzles, while minimizing the number of solenoids/control valves required to accomplish the task in injection systems, e.g., for aircraft gas turbines. Embodiments can also provide an ability to have a control system command injectant flow and purge air on/off, while also allowing differentiation between primary and secondary purge operation through the use of control laws and passive mechanical valve actuation, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fluid injection system, comprising:
a main flow line configured to pass injectant flow therethrough;
a primary flow line connected to the main flow line and configured to provide a primary portion of the injectant flow from the main flow line to a primary injector;
a primary flow valve disposed on the primary flow line and configured to selectively allow injectant flow to the primary flow line from the main flow line in an open primary flow valve state, and to prevent injectant flow to the primary flow line from the main flow line in a closed primary flow valve state;
a secondary flow line connected to the main flow line and configured to provide a secondary portion of the injectant flow from the main flow line to a secondary injector;
a secondary flow valve disposed on the secondary flow line and configured to selectively allow injectant flow to the secondary flow line from the main flow line in an open secondary flow valve state, and to prevent injectant flow to the secondary flow line from the main flow line in a closed secondary flow valve state;
a primary purge branch in fluid communication with the primary flow line and connected to a purge gas line to receive a purge gas flow from the purge gas line;
a primary purge valve disposed in the primary purge branch between the primary flow line and the purge gas line, the primary purge valve configured to prevent the purge gas flow in a closed primary purge valve state, and to allow purge gas flow in an open primary purge valve state to purge the primary flow line;
a secondary purge branch in fluid communication with the secondary flow line and connected to a purge gas line to receive a purge gas flow from the purge gas line; and
a secondary purge valve disposed between the purge gas line and both of the primary purge branch and the secondary purge branch, the secondary purge valve configured to selectively prevent purge gas flow to the primary purge gas valve and the secondary purge branch from the purge gas line in a closed secondary purge valve state, and to allow purge gas flow to each of the primary purge gas valve and the secondary purge branch from the purge gas line in an open secondary purge valve state,
wherein the primary purge branch and the secondary purge branch are in fluid communication such that the primary purge valve is between the primary flow line and the secondary flow line, wherein the primary purge valve is a check valve such that the primary purge valve transitions from the closed primary purge valve state to the open primary purge valve state when pressure in the primary flow line is exceeded by pressure in the secondary flow line and/or purge gas line, wherein the primary flow valve, the secondary flow valve, and the secondary purge valve are solenoid valves, wherein the primary flow valve, the secondary flow valve, and the secondary purge valve include a biased de-energized state and an energized state, wherein the secondary flow valve and the secondary purge valve are configured to have opposite states such that when one is open, the other is closed, wherein the open secondary flow valve state is the energized state of the secondary flow valve, wherein the closed secondary purge valve state is an energized state of the secondary purge valve, wherein the closed secondary flow valve state is the biased de-energized state of the secondary flow valve, and wherein the open secondary purge valve state is the biased de-energized state of the secondary purge valve, wherein the controller is configured to execute a purge sequence from an operational state where injectant flow is flowing through both the primary and secondary flow lines, the purge sequence including;
closing the secondary flow valve to shut off injectant flow to the secondary flow line from the main line; and
opening the secondary purge valve after or during closing the secondary flow valve to cause purge gas flow to purge the secondary flow line.

2. The system of claim 1, wherein the purge sequence further includes:
allowing injectant flow in the primary flow line to reduce in pressure to below the purge gas pressure to cause the primary purge valve to open to cause purge gas flow to purge the primary flow line; and
closing the primary flow valve after purging of the primary flow line.

3. The system of claim 2, wherein the purge sequence further comprises briefly opening the secondary flow valve after closing the primary flow valve to cause any remainder fluid in the secondary flow line to be purged into the main flow line, then closing the secondary flow valve.

4. The system of claim 1, further comprising a controller configured to control each of the primary flow valve, the secondary flow valve, and the secondary purge valve.

5. A fuel system, comprising:
a fluid injection system, comprising a plurality of controllable valves and a passive valve arranged to cause selective and/or sequential purging of a secondary flow line and a primary flow line, wherein the plurality of controllable valves includes a primary flow valve, a secondary flow valve, and a secondary purge valve, wherein the primary flow valve, the secondary flow valve, and the secondary purge valve are solenoid valves, wherein the passive valve includes a primary purge valve, wherein the primary purge valve is a check valve, wherein the primary flow valve, the secondary flow valve, and the secondary purge valve include a biased de-energized state and an energized state, wherein the secondary flow valve and the secondary purge valve are configured to have opposite states such that when one is open, the other is closed, wherein the open secondary flow valve state is the energized state of the secondary flow valve, wherein the closed secondary purge valve state is an energized state of the secondary purge valve, wherein the closed secondary flow valve state is the biased de-energized state of the secondary flow valve, and wherein the open secondary purge valve state is the biased de-energized state of the secondary purge valve, and further comprising a controller, wherein the controller is configured to execute a purge sequence from an operational state where injectant flow is flowing through both the primary and secondary flow lines, the purge sequence including;
closing the secondary flow valve to shut off injectant flow to the secondary flow line from the main line; and
opening the secondary purge valve after or during closing the secondary flow valve to cause purge gas flow to purge the secondary flow line.

6. The fuel system of claim 5, wherein the plurality of controllable valves further includes a fuel injector, wherein the three controllable valves and the passive are the only valves in the fluid injection system.

7. A method, comprising:
operating one or more controllable valves to purge a secondary flow line of a fluid injection system with a purge gas flow; and
causing a passive valve to open using a purge gas pressure to cause purging of a primary flow line of the fluid injection system after purging the secondary flow line, wherein the plurality of controllable valves includes a primary flow valve, a secondary flow valve, and a secondary purge valve, wherein the primary flow valve, the secondary flow valve, and the secondary purge valve are solenoid valves, wherein the passive valve includes a primary purge valve, wherein the primary purge valve is a check valve, wherein the primary flow valve, the secondary flow valve, and the secondary purge valve include a biased de-energized state and an energized state, wherein the secondary flow valve and the secondary purge valve are configured to have opposite states such that when one is open, the other is closed, wherein the open secondary flow valve state is the energized state of the secondary flow valve, wherein the closed secondary purge valve state is an energized state of the secondary purge valve, wherein the closed secondary flow valve state is the biased de-energized state of the secondary flow valve, and wherein the open secondary purge valve state is the biased de-energized state of the secondary purge valve,
wherein operating one or more controllable valves includes:
closing a secondary flow valve to shut off injectant flow to the secondary flow line from a main line; and
opening a secondary purge valve after or during closing the secondary flow valve to cause purge gas flow to purge the secondary flow line.

8. The method of claim 7, wherein causing the passive valve to open includes:
allowing injectant flow in the primary flow line to reduce in pressure to below the purge gas pressure to cause the passive valve to open to cause purge gas flow to purge the primary flow line.

9. The method of claim 8, further comprising closing the primary flow valve after purging of the primary flow line.

10. The method of claim 9, further comprising briefly opening the secondary flow valve after closing the primary flow valve to cause any remainder fluid in the secondary flow line to be purged into the main flow line, then closing the secondary flow valve.

* * * * *